(12) United States Patent
Morrison et al.

(10) Patent No.: US 8,055,022 B2
(45) Date of Patent: Nov. 8, 2011

(54) PASSIVE TOUCH SYSTEM AND METHOD OF DETECTING USER INPUT

(75) Inventors: Gerald Morrison, Calgary (CA); Manvinder Singh, Calgary (CA)

(73) Assignee: SMART Technologies ULC (CA)

( * ) Notice: Subject to any disclaimer, the term of this patent is extended or adjusted under 35 U.S.C. 154(b) by 167 days.

(21) Appl. No.: 12/391,759

(22) Filed: Feb. 24, 2009

(65) Prior Publication Data

US 2009/0153523 A1    Jun. 18, 2009

Related U.S. Application Data

(63) Continuation of application No. 12/118,407, filed on May 9, 2008, now abandoned, which is a continuation of application No. 11/248,166, filed on Oct. 13, 2005, now abandoned, which is a continuation of application No. 10/408,671, filed on Apr. 8, 2003, now abandoned, which is a continuation of application No. 09/610,481, filed on Jul. 5, 2000, now Pat. No. 6,803,906.

(51) Int. Cl.
*G06K 9/00* (2006.01)
*G06K 9/36* (2006.01)
*G06F 3/041* (2006.01)

(52) U.S. Cl. .......................... 382/103; 382/291; 345/173
(58) Field of Classification Search .................. 382/103, 382/106, 107, 154, 192, 193, 194, 286, 291, 382/292; 348/42, 47, 48, 143, 153, 159; 345/157, 168, 173, 863

See application file for complete search history.

(56) References Cited

U.S. PATENT DOCUMENTS

| | | | |
|---|---|---|---|
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |
| 3,478,220 A | 11/1969 | Milroy | |

(Continued)

FOREIGN PATENT DOCUMENTS

AU   2003233728 A1   12/2003

(Continued)

OTHER PUBLICATIONS

International Search Report for PCT/CA2008/001350 mailed Oct. 17, 2008 (5 Pages).

(Continued)

*Primary Examiner* — Yon Couso
(74) *Attorney, Agent, or Firm* — Katten Muchin Rosenman LLP

(57) ABSTRACT

A method of tracking an object of interest preferably includes (i) acquiring a first image and a second image representing different viewpoints of the object of interest; (ii) processing the first image into a first image data set and the second image into a second image data set; (iii) processing the first image data set and the second image data set to generate a background data set associated with a background; (iv) generating a first difference map by determining differences between the first image data set and the background data set and a second difference map by determining differences between the second image data set and the background data set; (v) detecting a first relative position of the object of interest in the first difference map and a second relative position of the object of interest in the second difference map; and (vi) producing an absolute position of the object of interest from the first and second relative positions of the object of interest.

12 Claims, 13 Drawing Sheets

U.S. PATENT DOCUMENTS

| | | |
|---|---|---|
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |

| | | |
|---|---|---|
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B2 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,121,470 B2 | 10/2006 | McCall et al. |
| 7,151,533 B2 | 12/2006 | Van Iperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,619,617 B2 | 11/2009 | Morrison et al. |
| 7,692,625 B2 | 4/2010 | Morrison et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildrerth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |

| | | | |
|---|---|---|---|
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0190162 A1 | 9/2005 | Newton |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0034486 A1 | 2/2006 | Morrison et al. |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0227120 A1 | 10/2006 | Eikman |
| 2006/0244734 A1 | 11/2006 | Hill et al. |
| 2006/0274067 A1 | 12/2006 | Hikai |
| 2006/0279558 A1 | 12/2006 | Van Delden et al. |
| 2007/0002028 A1 | 1/2007 | Morrison et al. |
| 2007/0019103 A1 | 1/2007 | Lieberman et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0139932 A1 | 6/2007 | Sun et al. |
| 2007/0152984 A1 | 7/2007 | Ording et al. |
| 2007/0152986 A1 | 7/2007 | Ogawa et al. |
| 2007/0165007 A1 | 7/2007 | Morrison et al. |
| 2007/0167709 A1 | 7/2007 | Slayton et al. |
| 2007/0205994 A1 | 9/2007 | van Ieperen |
| 2007/0236454 A1 | 10/2007 | Ung et al. |
| 2007/0273842 A1 | 11/2007 | Morrison et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0259050 A1 | 10/2008 | Lin et al. |
| 2008/0259052 A1 | 10/2008 | Lin et al. |
| 2009/0058832 A1 | 3/2009 | Newton |
| 2009/0058833 A1 | 3/2009 | Newton |
| 2009/0146972 A1 | 6/2009 | Morrison et al. |

FOREIGN PATENT DOCUMENTS

| | | |
|---|---|---|
| AU | 2006243730 A1 | 11/2006 |
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 0125068 A2 | 11/1984 |
| EP | 0 279 652 A2 | 8/1988 |
| EP | 0 347 725 A2 | 12/1989 |
| EP | 0420335 | 4/1991 |
| EP | 0 657 841 A1 | 6/1995 |
| EP | 0 762 319 A2 | 3/1997 |
| EP | 0 829 798 A2 | 3/1998 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 | 1/2006 |
| EP | 1674977 | 6/2006 |
| EP | 1 297 488 B1 | 11/2006 |
| EP | 1741186 | 1/2007 |
| EP | 1766501 | 3/2007 |
| EP | 1830248 A1 | 9/2007 |
| EP | 1877893 | 1/2008 |
| ES | 2279823 T3 | 9/2007 |
| GB | 1575420 | 9/1980 |
| GB | 2176282 A | 5/1986 |
| GB | 2204126 A | 11/1988 |
| GB | 2263765 A | 8/1993 |
| JP | 57-211637 A | 12/1982 |
| JP | 61-196317 A | 8/1986 |
| JP | 61-260322 A | 11/1986 |
| JP | 62-005428 | 1/1987 |
| JP | 63-223819 | 9/1988 |
| JP | 3-054618 A | 3/1991 |
| JP | 03-244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |

| | | | |
|---|---|---|---|
| JP | 5-197810 A | 8/1993 |
| JP | 06-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282456 A | 10/2001 |
| JP | 2001-282457 A | 10/2001 |
| JP | 2002-055770 | 2/2002 |
| JP | 2002-236547 A | 8/2002 |
| JP | 2003-65716 A | 3/2003 |
| JP | 2003-158597 A | 5/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A1 | 8/2004 |
| WO | 2004/090706 A2 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | 2005/106775 A1 | 11/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/051633 A1 | 5/2010 |

OTHER PUBLICATIONS

International Search Report and Written Opinion for PCT/CA2007/002184 mailed Mar. 13, 2008 (13 Pages).
International Search Report and Written Opinion for PCT/CA2004/001759 mailed Feb. 21, 2005 (7 Pages).
International Search Report for PCT/CA01/00980 mailed Oct. 22, 2001 (3 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 20067 (2 pages).
European Search Report for EP 06 01 9269 dated Nov. 9, 2006 (4 pages).
European Search Report for EP 06 01 9268 dated Nov. 9, 2006 (4 pages).
European Search Report for EP 04 25 1392 dated Jan. 11, 2007 (2 pages).
European Search Report for EP 02 25 3594 dated Dec. 14, 2005 (3 pages).
Partial European Search Report for EP 03 25 7166 dated May 19, 2006 (4 pages).
May 12, 2009 Office Action for Canadian Patent Application No. 2,412,878 (4 pages).
Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
Funk, Bud K., CCD's in optical panels deliver high resolution, Electronic Design, Sep. 27, 1980, pp. 139-143.
Hartley, R. and Zisserman, A., "Multiple View Geometry in Computer Vision", Cambridge University Press, First published 2000, Reprinted (with corrections) 2001, pp. 70-73, 92-93, and 98-99.
Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Wang, F., et al., "Stereo camera calibration without absolute world coordinate information", SPIE, vol. 2620, pp. 655-662, Jun. 14, 1995.
Wrobel, B., "Minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).

Jul. 5, 2010 Office Action, with English translation, for Japanese Patent Application No. 2005-000268 (6 pages).

Villamor et al. "Touch Gesture Reference Guide", Apr. 15, 2010.

"White Paper", Digital Vision Touch Technology, Feb. 2003.

International Preliminary Report on Patentability, PCT/NZ2004/000029, May 20, 2005 (21 pages).

"International Preliminary Report on Patentability", PCT/US2008/060102, Oct. 22, 2009 (9 pages).

International Search Report for PCT/CA2010/001085 mailed Oct. 12, 2010 (5 pages).

"International Application Serial No. PCT/US2008/060102, Search Report & Written opinion mailed Feb. 12, 2009" (14 pages).

International Application Serial No. PCT/US2008/074749, Search Report & Written Opinion mailed Feb. 11, 2009 (10 pages).

"International Application Serial No. PCT/US2008/074755, International Search Report and Written Opinion mailed Jan. 29, 2009" (14 pages).

International Search Report for PCT/NZ05/00092 Sep. 27, 2006 (4 pages).

Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.

Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).

*Touch Panel*, vol. 5 No. 2-3 (Sep. 2010).

*Touch Panel*, vol. 5 No. 4 (Nov. 2010).

Benko, et al., "Precise Selection Techniques for Multi-Touch Screens", Proc. ACM CHI 2006: Human Factors in Computer Systems, pp. 1263-1272.

Buxton, W., "Issues and Techniques in Touch-Sensitive Tablet Input," Computer Graphics, 19(3), Proceedings of SIGGRAPH '85, 1985, pp. 215-223.

VGA-format CMOS Camera-on-a-Chip for Multimedia Applications, Photobit Corporation, 1999 (2 pages).

PERPENDICULAR POINTER APPROACHING TOUCH SURFACE
CALCULATED CENTER LINE SHOWS EXPECTED POINT OF CONTACT.

PERPENDICULAR POINTER IN CONTACT WITH TOUCH SURFACE

NON-PERPENDICULAR POINTER APPROACHING TOUCH SURFACE
CALCULATED CENTER LINE SHOWS EXPECTED POINT OF CONTACT.

NON-PERPENDICULAR POINTER IN CONTACT WITH TOUCH SURFACE.

PASSIVE TOUCH SYSTEM AND METHOD OF DETECTING USER INPUT

This application is a continuation of U.S. patent application Ser. No. 12/118,407, filed May 9, 2008, which is a continuation of U.S. patent application Ser. No. 11/248,166, filed Oct. 13, 2005 (abandoned), which is a continuation of U.S. patent application Ser. No. 10/408,671, filed Apr. 8, 2003 (abandoned), which is a continuation of U.S. patent application Ser. No. 09/610,481, filed Jul. 5, 2000, now U.S. Pat. No. 6,803,906, which issued Oct. 12, 2004, all of which are incorporated herein by reference.

FIELD OF THE INVENTION

The present invention related generally to input devices and in particular to a passive touch system and method of detecting use input.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. A passive pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

Passive touch systems have a number of applications relating to computer operation and video display. For example, in one interactive application, as is disclosed in U.S. Pat. No. 5,448,263 to Martin, assigned to the assignee of the present invention, the passive touch system is coupled to a computer and the computer display is projected onto the touch surface of the touch screen. The coordinates representing specific locations on the touch surface are mapped to the computer display. When a user contacts the touch surface, the coordinates of the contact are fed back to the computer and mapped to the computer display thereby allowing the user to operate the computer in a manner similar to using a computer mouse simply by contacting the touch surface. Furthermore, the coordinates fed back to the computer can be recorded in an application and redisplayed at a later time. Recording contact coordinates is typically done when it is desired to record information written or drawn on the touch surface by the user.

The resolution of a passive touch screen determines if the touch system is suitable for recording information written or drawn on the touch screen or only useful for selecting areas on the touch screen mapped to large regions on the computer or video display in order to manipulate the computer or video display. Resolution is typically measured in dots per inch (DPI). The DPI is related to the size of the touch screen and the sampling ability of the touch system hardware and software used to detect contacts on the touch surface.

Low-resolution passive touch screens only have enough DPI to detect contacts on the touch surface within a large group of pixels displayed by the computer or video system. Therefore, these low-resolution passive touch screens are useful only for manipulating the computer or video display.

On the other hand, high-resolution passive touch screens have sufficient DPI to detect contacts that are proportional to a small number of pixels or sub-pixels of the computer or video display. However, a requirement for high-resolution touch screens is the ability to detect when the pointer is in contact with the touch surface. This is necessary for writing, drawing, mouse-click operations, etc. Without the ability to detect pointer contact with the touch screen, writing and drawing would be one continues operation, and mouse clicks would not be possible thereby making computer display manipulation impossible. A secondary requirement is the ability to detect when the pointer is "hovering" above the touch surface. Although not required for writing or drawing, today's computer operating systems are increasingly using hover information to manipulate computer or video displays or pop-up information boxes.

Passive touch screens are typically either of the analog resistive type, Surface Acoustic Wave (SAW) type or capacitive type. Unfortunately, these touch screens suffer from a number of problems or shortcomings as will be described.

Analog resistive touch screens typically have a high-resolution.

Depending on the complexity of the touch system, the resolution of the touch screen can produce 4096×4096 DPI or higher. Analog resistive touch screens are constructed using two flexible sheets that are coated with a resistive material and arranged as a sandwich. The sheets do not come into contact with each other until a contact has been made. The sheets are typically kept separated by insulating microdots or by an insulating air space. The sheets are constructed from ITO, which is mostly transparent. Thus, the touch screen introduces some image distortion but very little parallax.

During operation of an analog resistive passive touch screen, a uniform voltage gradient is applied in one direction along a first of the sheets. The second sheet measures the voltage along the first sheet when the two sheets contact one another as a result of a contact made on the touch surface. Since the voltage gradient of the first sheet can be translated to the distance along the first sheet, the measured voltage is proportional to the position of the contact on the touch surface. When a contact coordinate on the first sheet is acquired, the uniform voltage gradient is then applied to the second sheet and the first sheet measures the voltage along the second sheet. The voltage gradient of the second sheet is proportional to the distance along the second sheet. These two contact coordinates represent the X-Y position of the contact on the touch surface in a Cartesian coordinate system.

Since mechanical pressure is required to bring both sheets into contact, analog resistive touch screens can only detect contact when there is sufficient pressure to bring the two sheets together. Analog resistive passive touch screens cannot sense when a pointer is hovering over the touch surface.

Therefore, contact events and positions can only be detected when actual contacts are made with the touch surface.

Surface Acoustic Wave (SAW) touch screens typically provide for medium resolution and are not suitable for recording good quality writing. SAW touch screens employ transducers on the borders of a glass surface to vibrate the glass and produce acoustic waves that ripple over the glass surface. When a contact is made on the glass surface, the waves reflect back and the contact position is determined from the signature of the reflected waves.

Unfortunately, SAW touch screens exhibit noticeable parallax due to the thickness of the vibrating glass which is placed over the surface of the video or computer display. Also, contact events and positions can only be detected when actual contacts are made with the glass surface. Furthermore, SAW touch screens do not scale beyond a few feet diagonal.

Capacitive touch screens provide for low resolution because contacts can only be determined in large areas (approximately ½"×½"). As a result, capacitive touch screens cannot be used for recording writing or drawing and are suitable for selecting areas on the touch screen corresponding to computer generated buttons displayed on the video or computer display. These touch screens also suffer disadvantages in that they are sensitive to temperature and humidity. Similar to analog resistive touch screens and SAW touch screens, capacitive touch screens can also only detect contact events and positions when actual contacts are made with the touch surface.

Scalability of passive touch screens is important since the demand for larger electronic digitizers is increasing. Where digitizers were once small desktop appliances, today they have found there way onto electronic whiteboarding applications. The need to build a passive touch sensitive "wall" has become a requirement for new touch screen applications. Existing passive touch screens of the types discussed above are all limited in the maximum size where they are still functional.

As will be appreciated, improvements to passive touch systems are desired. It is therefore an object of the present invention to provide a novel passive touch system and method of detecting user input.

SUMMARY OF THE INVENTION

According to one aspect of the present invention there is provided a passive touch system comprising:

a passive touch surface;

at least two cameras associated with said touch surface, said at least two cameras acquiring images of said touch surface from different locations and having overlapping fields of view; and a processor receiving and processing images acquired by said at least two cameras to detect the existence of a pointer therein and to determine the location of said pointer relative to said touch surface.

In a preferred embodiment, the at least two cameras are two-dimensional image sensor and lens assemblies having fields of view looking along the plane of the touch surface. The processor determines the location of the pointer relative to the touch screen using triangulation. The processor also determines when the pointer is in contact with the touch surface and when the pointer is hovering above the touch surface.

In one embodiment, the processor selects pixel subsets of images acquired by the image sensor and lens assemblies and processes the pixel subsets to determine the existence of the pointer. The processor includes a digital signal processor associated with each image sensor and lens assembly and a master digital signal processor in communication with the digital signal processors. The digital signal processors associated with each image sensor and lens assembly select the pixel subsets and process the pixel subsets to determine the existence of the pointer. The master digital signal processor receives pixel characteristic data from the digital signal processors and triangulates the pixel characteristic data to determine the location of the pointer relative to the touch surface.

According to another aspect of the present invention there is provided a method of detecting the position of a pointer relative to a passive touch surface comprising the steps of:

acquiring images of said touch surface from different locations using cameras having overlapping fields of view; and processing said images to detect the existence of a pointer therein and to determine the location of said pointer relative to said touch surface.

The present invention provides advantages in that the passive touch system is of high resolution and allows actual pointer contacts with the touch surface as well as pointer hovers above the touch surface to be detected and corresponding output generated. Also, the present passive touch system provides advantages in that it does not suffer from parallax, image distortion, pointer position restrictions, image projection and scalability problems that are associated with prior art passive touch systems.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
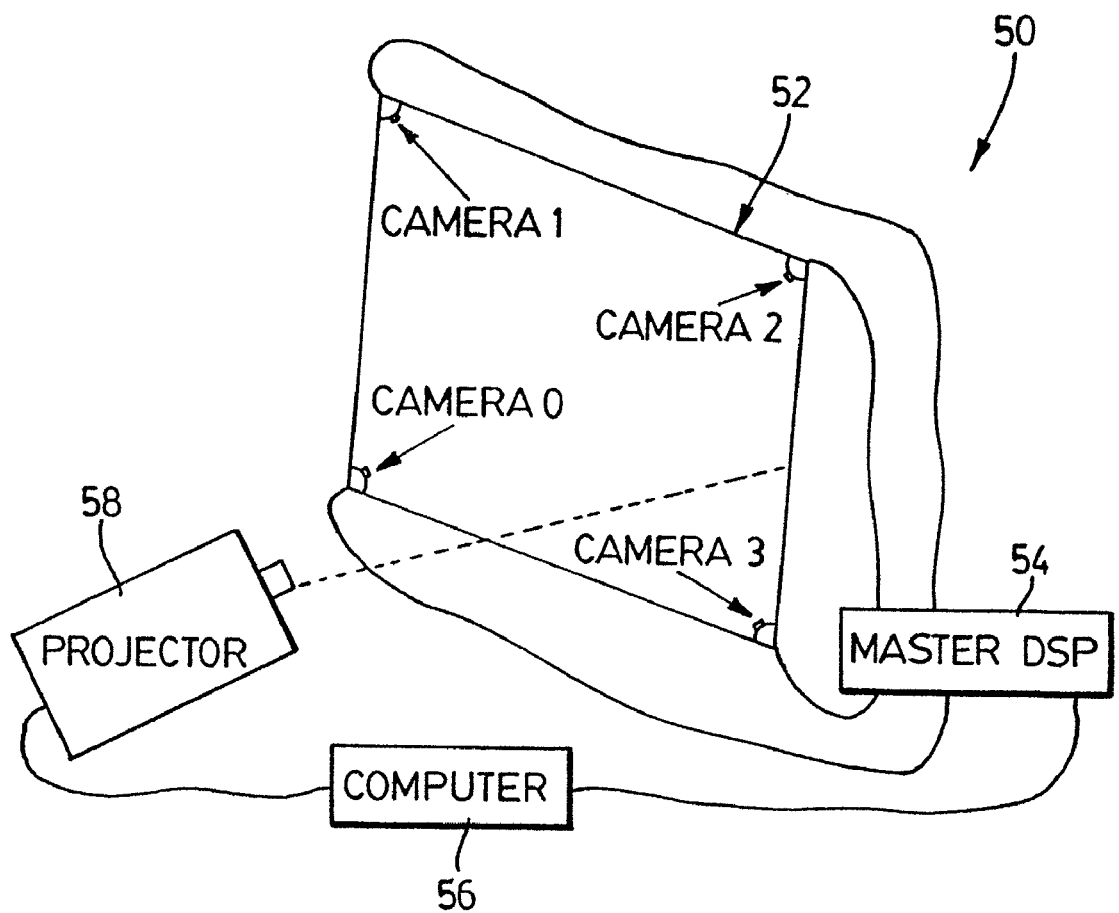
FIG. 1 is a schematic diagram of a passive touch system in accordance with the present invention.

Turning now to FIG. 1, a passive touch system in accordance with the present invention is shown and is generally indicated to by reference numeral 50. As can be seen, passive touch system 50 includes a touch screen 52 coupled to a master controller 54. Master controller 54 is also coupled to a computer 56. Computer 56 executes one or more application programs and provides display output that is projected onto the touch screen 52 via a projector 58. The touch screen 52, master controller 54, computer 56 and projector 58 form a closed-loop so that user contacts with the touch screen 52 can be recorded as writing or drawing or used to control execution of application programs executed by the computer 56.

Figure 2:
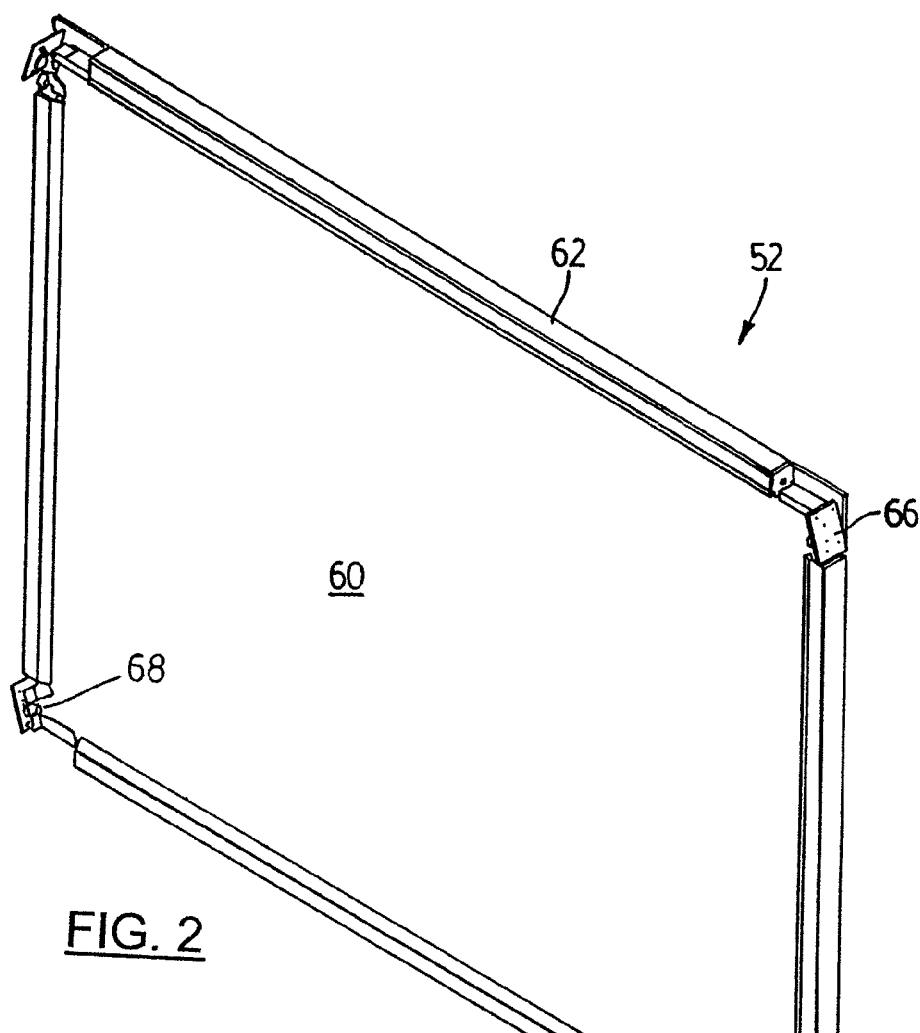
FIG. 2 is an isometric view of a touch screen forming part of the passive touch system of FIG. 1.
Figure 3:
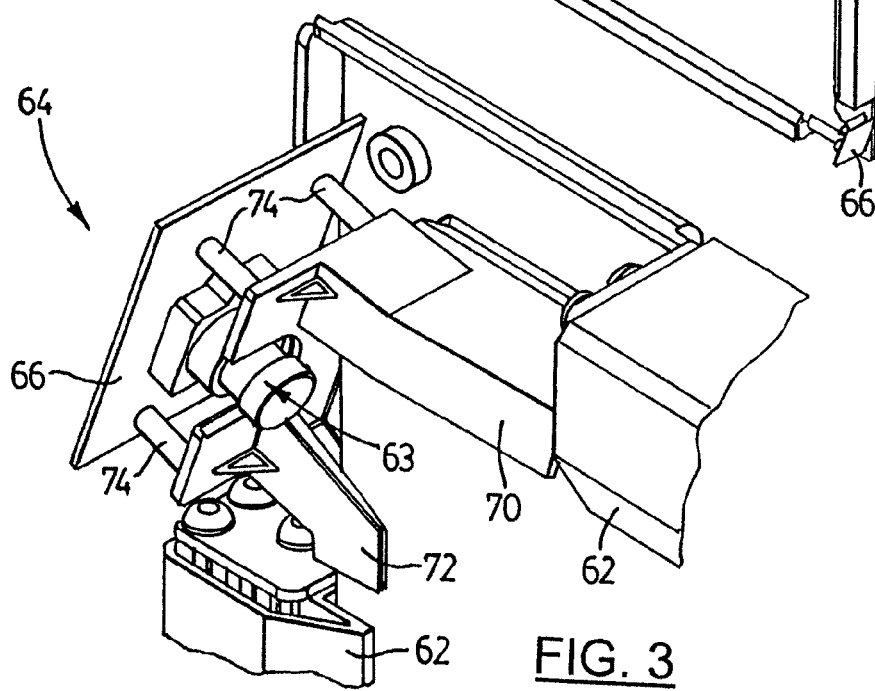
FIG. 3 is an isometric view of a corner portion of the touch screen of FIG. 2.
Figure 4:
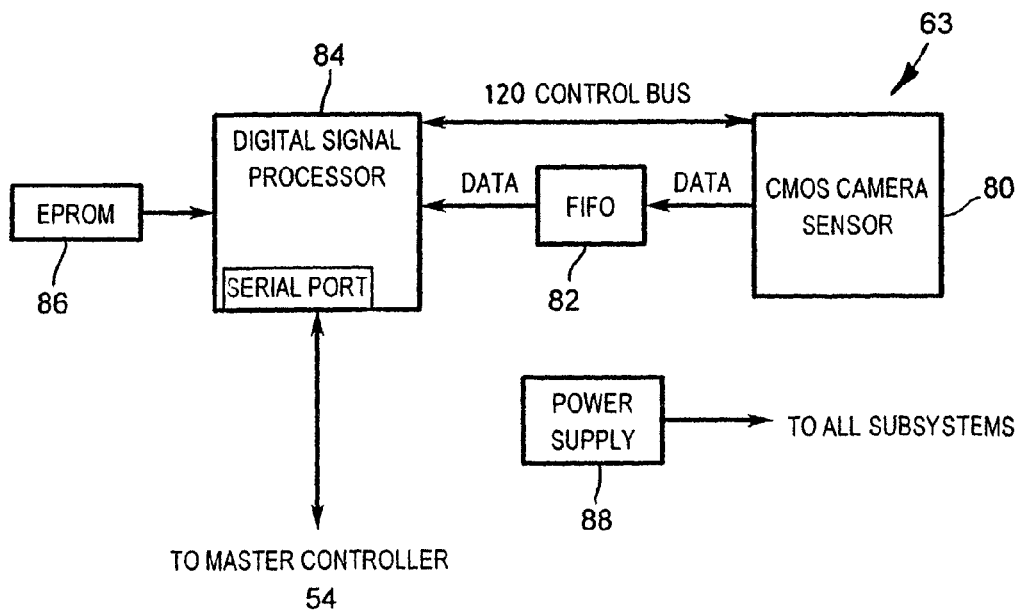
FIG. 4 is a schematic diagram of a camera assembly forming part of the touch screen of FIG. 2.

FIGS. 2 to 4 better illustrate the touch screen 52. Touch screen 52 includes a touch surface 60 bordered by a frame 62. Touch surface 60 is passive and is in the form of a rectangular planar sheet of material. Camera subsystems are associated with each corner of the touch screen 52. Each camera subsystem includes a camera assembly 63 mounted adjacent a different corner of the touch screen 52 by a frame assembly 64. Each frame assembly 64 includes an angled support plate 66 on which the camera assembly 63 is mounted. Supporting frame elements 70 and 72 are mounted on the plate 66 by posts 74 and secure the plate 66 to the frame 62.

Each camera assembly 63, in this embodiment, includes a camera in the form of a two-dimensional CMOS camera image sensor and associated lens assembly 80, a first-in-first-out (FIFO) buffer 82 coupled to the image sensor and lens assembly 80 by a data bus and a digital signal processor (DSP) 84 coupled to the FIFO 82 by a data bus and to the image sensor and lens assembly 80 by a control bus. A boot EPROM 86 and a power supply subsystem 88 are also included.

In the present embodiment, the CMOS camera image sensor is a Photobit PB300 image sensor configured for a 20×640 pixel subarray that can be operated to capture image frames at rates in excess of 200 frames per second. The FIFO buffer 82 is manufactured by Cypress under part number CY7C4211V and the DSP 84 is manufactured by Analog Devices under part number ADSP2185M.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

Figure 5:
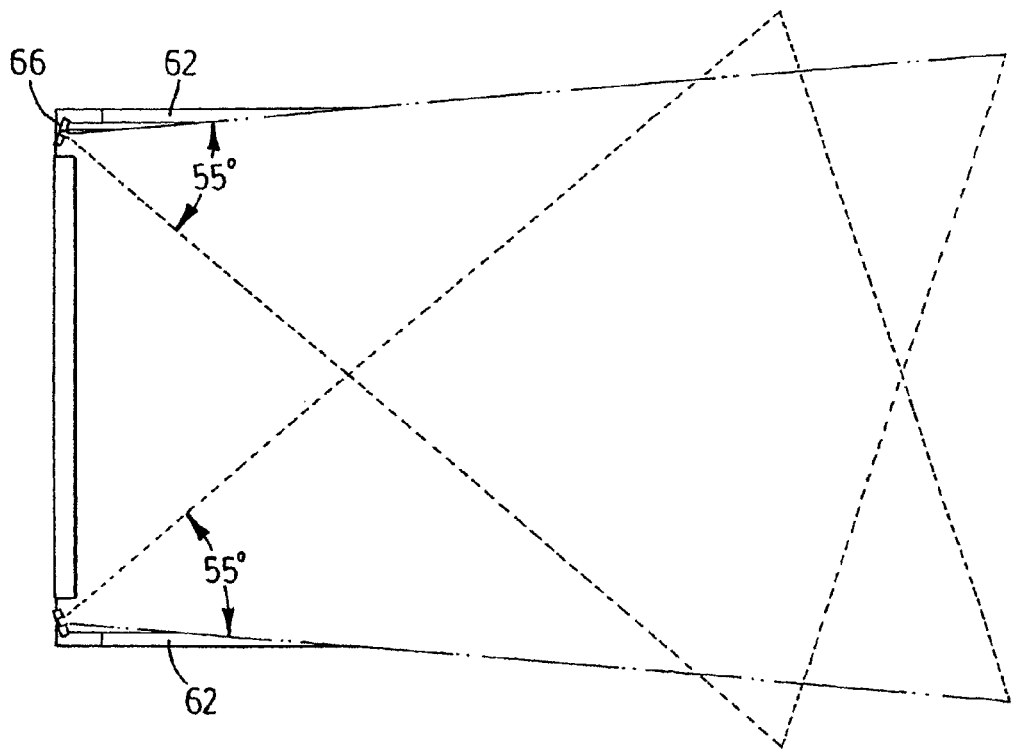
FIG. 5 is a front lavational view of the touch screen of FIG. 2 showing the fields of view of two camera assemblies.

As shown in FIG. 5, each image sensor and lens assembly 80 has a 55° field of view. The angle of the plate 66 is selected so that the field of view of each image and lens assembly 80 includes at least the majority of a different peripheral edge of the touch surface 60. In this way, the entire touch surface 60 is within the fields of view of the image sensor and lens assemblies 80.

Figure 6:
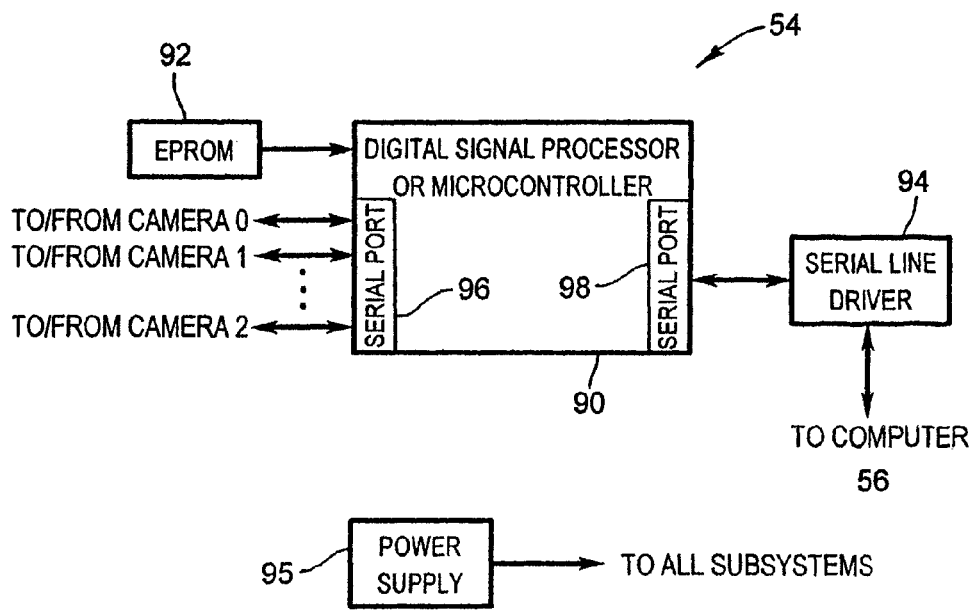
FIG. 6 is a schematic diagram of a master controller forming part of the passive touch system of FIG. 1.

Master controller 54 is best illustrated in FIG. 6 and includes a DSP 90, a boot EPROM 92, a serial line driver 94 and a power supply subsystem 95. The DSP 90 communicates with the DSPs 84 of the camera assemblies 63 over a data bus through a serial port 96 and communicates with the computer 56 over a data bus through a serial port 98 and the serial line driver 94. In this embodiment, the DSP 90 is also manufactured by Analog Devices under part number ADSP2185M. The serial line driver 94 is manufactured by Analog Devices under part number ADM222.

The master controller 54 and each camera assembly 63 follow a communication protocol that enables bi-directional communications via a common serial cable similar to a universal serial bus (USB). The transmission bandwidth is divided into thirty-two (32) 16-bit channels. Of the thirty-two channels, five (5) channels are assigned to each of the DSPs 84 in the camera assemblies 63 and to the DSP 90 in the master controller 54 and the remaining seven (7) channels are unused. The master controller 54 monitors the twenty (20) channels assigned to the camera assembly DSPs 84 while the DSPs 84 in the camera subsystems 63 monitor the five (5) channels assigned to the master controller DSP 90. Communications between the master controller 54 and the camera assemblies 63 are performed as background processes in response to interrupts.

The general operation of the passive touch system 50 will now be described. Each camera assembly 63 acquires images of the touch surface 60 within the field of view of its image sensor and lens assembly 80 at the frame rate established by the DSP clock signals and processes the images to determine if a pointer is in the acquired images. If a pointer is in the acquired images, the images are further processed to determine characteristics of the pointer contacting or hovering above the touch surface 60. Pointer characteristics are then converted into pointer information packets (PIPs) and the PIPs are queued for transmission to the master controller 54.

The camera assemblies 63 also receive and respond to diagnostic PIPs generated by the master controller 54.

The master controller 54 polls the camera assemblies 63 at a set frequency (in this embodiment 70 times per second) for PIPs and triangulates pointer characteristics in the PIPs to determine pointer position data. The master controller 54 in turn transmits pointer position data and/or status information to the personal computer 56. In this manner, the pointer position data transmitted to the personal computer 56 can be recorded as writing or drawing or can be used to control execution of application programs executed by the computer 56. The computer 56 also updates the display output conveyed to the projector 58 so that information projected onto the touch surface 60 reflects the pointer activity.

The master controller 54 also receives commands from the personal computer 56 and responds accordingly as well as generates and conveys diagnostic PIPs to the camera assemblies 63.

Specifics concerning the processing of acquired images and the triangulation of pointer characteristics in PIPs will now be described with particular reference to FIGS. 7 to 13.

Initially, an alignment routine is performed to align the image sensor and lens assemblies 80. During the alignment routine, a pointer is held in the approximate center of the touch surface 60. Subsets of the pixels of the image sensor and lens assemblies 80 are then selected until a subset of pixels for each image sensor and lens assembly 80 is found that captures the pointer and the pointer tip on the touch surface 60. This alignment routine allows for a relaxation in mechanical mounting of the image sensor and lens assemblies on the frame assemblies 64. The identification of the pointer tip on the touch surface 60 also gives a calibration that determines the row of pixels of each image sensor and lens assembly 80 that detects actual contacts made with the touch surface. Knowing these pixel rows allows the difference between pointer hover and pointer contact to be determined.

In this embodiment, since a computer display is projected onto the touch surface 60, during the alignment routine several known coordinate locations are also displayed and the user is required to touch these coordinate locations in sequence using the pointer so that the subset of pixels for each of image sensor and lens assembly 80 includes all of the coordinate locations as well. Calibration data is then stored for reference so that pointer contacts on the touch surface 60 can be mapped to corresponding areas on the computer display.

As mentioned above, each camera assembly 63 acquires images of the touch surface 60 within its field of view. The images are acquired by the image and lens assembly 80 at intervals in response to the clock signals received from the DSP 84. Each image acquired by the image and lens assembly 80 is sent to the FIFO buffer 82.

Figure 14:
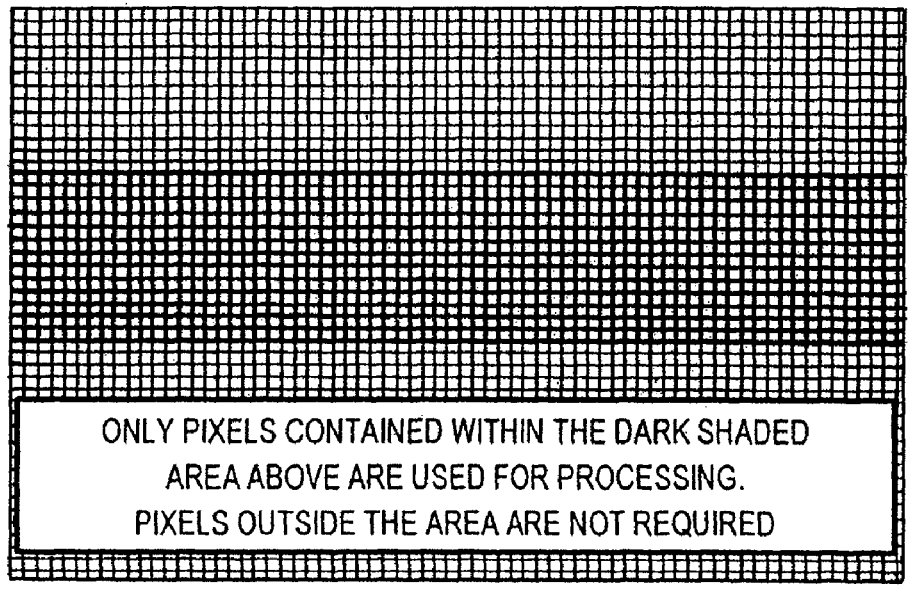
FIG. 14 shows an acquired image and a pixel subset of the image that is processed.

The DSP 84 in turn reads each image from the FIFO buffer 82 and processes the image to determine if a pointer is located in the image and if so, to extract the pointer and related pointer statistical information. To avoid processing significant numbers of pixels containing no useful information, only the subset of the pixels in the image determined during the alignment routine are actually processed as is shown in FIG. 14.

Figure 7:
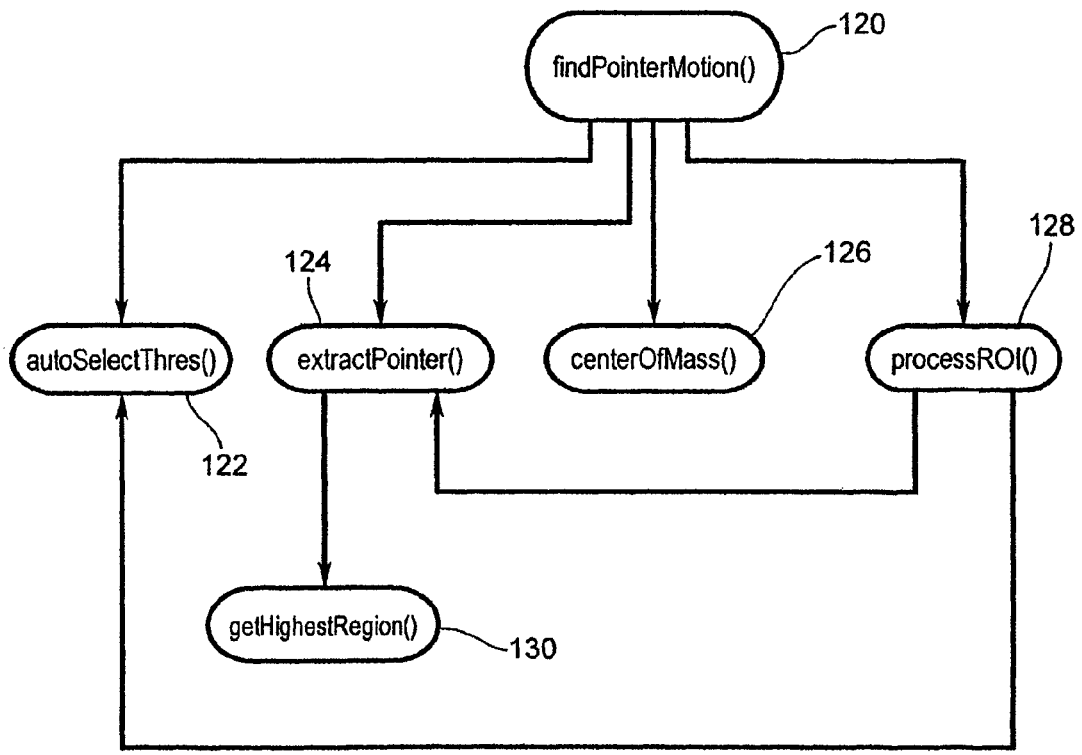
FIG. 7 is case diagram showing functions executed by the camera assemblies.

In order to determine if a pointer is located in the image and extract pointer and related pointer statistical information, the DSP 84 executes a main findPointerMotion( ) function 120 that calls a number of other functions, namely an autoSelectThres( ) function 122, an extractPointer function 124, a centerOfMass( ) function 126, and a processROI( ) function 128 (see FIG. 7). The extractPointer( ) function 128 also calls a getHighestRegion( ) function 130.

Figure 8:
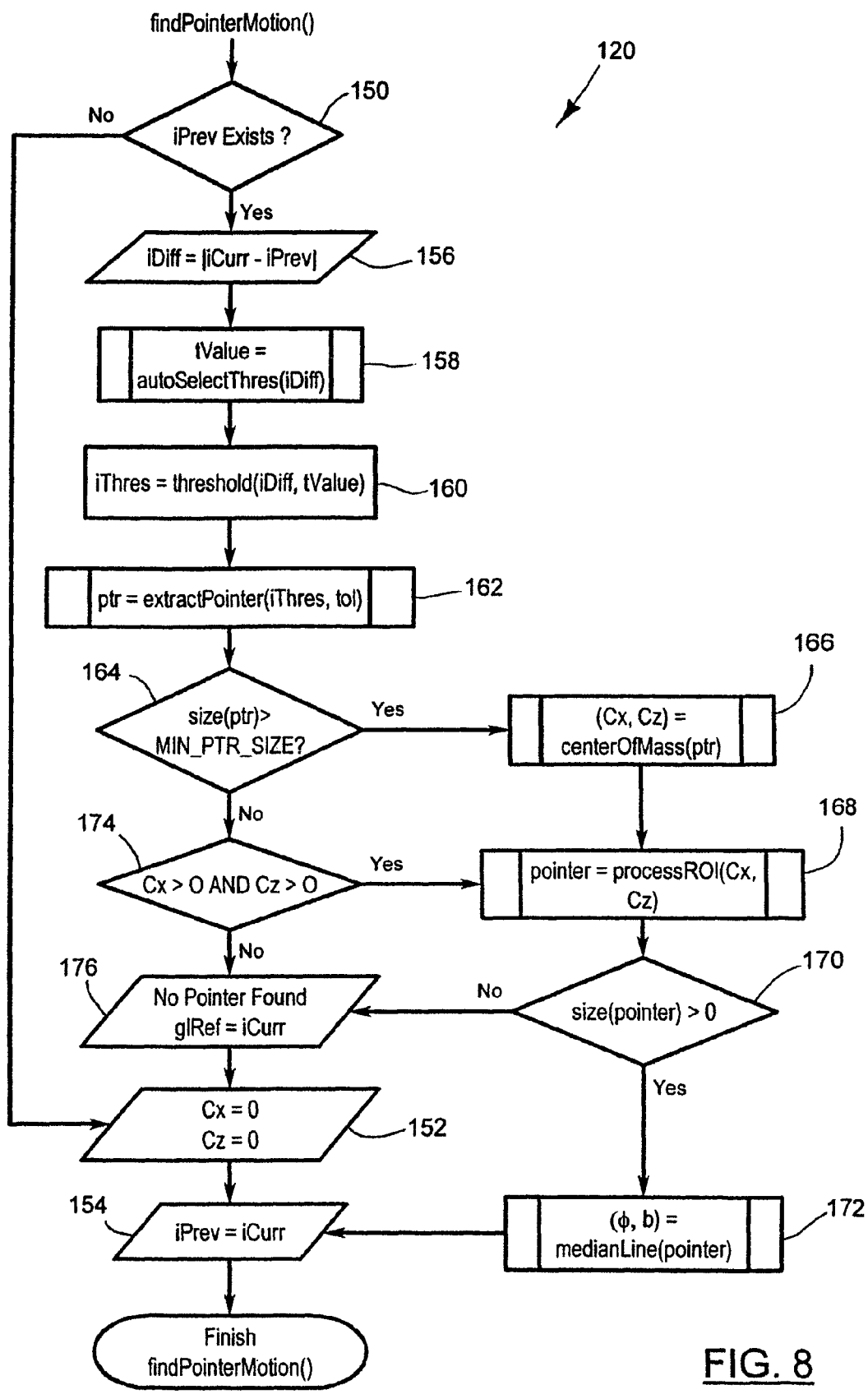
FIG. 8 is a flowchart showing the steps performed during execution of a findPointerMotion( ) function.

The findPointerMotion( ) function 120 is used to extract the pointer from the image. Turning now to FIG. 8, the steps performed during execution of the findPointerMotion( ) function 120 is shown. When the findPointerMotion( ) function is called, a check is made to determine if a previous image iPrev including a pointer exists (step 150). If no previous image iPrev exists, center of mass parameters Cx and Cz are assigned zero values (step 152). The current image iCurr being processed is then designated as the previous image iPrev (step 154) to complete the findPointerMotion( ) function.

At step 150, if a previous image iPrev exists, the current image iCurr is subtracted from the previous image iPrev and the absolute value of the difference image iDiff is taken (step 156). By forming the difference image iDiff, background features and noise are removed. The autoSelectThres( ) function 122 is then called to select a threshold value tValue for the difference image iDiff (step 158) based on the histogram of the difference image iDiff. The threshold iThres of the difference image iDiff is then taken (step 160) to highlight further the pointer within the current image iCurr. During thresholding a grayscale image is mapped to the binary difference image iDiff. Pixels in the difference image with values equal to or less than the threshold value tValue are made black while all other pixels are made white. The result is a binary image containing the pointer and some noise both designated by white pixels.

Once the difference image has been thresholded, the extractPointer function 124 is called (step 162) to extract the pointer ptr from the difference image iDiff and ignore the noise. The size of the pointer ptr is then examined to determine if it is greater than a threshold value MIN_PTR_SIZE (step 164).

If the size of the pointer is greater than the threshold value MIN_PTR_SIZE, the centerOfMass( ) function 126 is called (step 166) to determine the center of the pointer. Following this, the processROI( ) function 128 is called (step 168) to select a region of interest ROI within the difference image iDiff and extract the pointer from the region of interest.

Once the pointer has been extracted from the region of interest ROI, the size of the extracted pointer is determined (step 170). If the pointer size is greater than zero, a medianLine function is called (step 172). During execution of the medianLine function, the median line of the pointer (i.e. the pointer location within the region of interest) is calculated using linear least squares. The current image iCurr is then designated as the previous image iPrev to complete the findPointerMotion( ) function.

At step 164, if the pointer size is equal to zero, the center of mass parameters Cx and Cz are examined (step 174). If both of the center of mass parameters Cx and Cz have values greater zero, the processROI( ) function 128 is called (step 168) to select a region of interest ROI within the difference image iDiff and extract the pointer from the region of interest. At step 174, if one or both of the center of mass parameters Cx and Cz have values equal to zero or at step 170, if the size of the pointer is less than zero, a no pointer found condition is determined (step 176). At this stage, the current image iCurr is designated as a calibration image glRef. The findPointerMotion( ) function then proceeds to step 152 where the center of mass parameters Cx and Cz are assigned zero values.

As mentioned above, at step 158, when the findPointerMotion( ) function 120 calls the autoSelectThres( ) function 122, a threshold value for the difference image iDiff is selected based on the histogram of the difference image so that when the difference image iDiff is thresholded, the pointer is further highlighted from background features and noise. Selection of the threshold value in this manner is more robust than hard-coding the threshold value.

Figure 9:
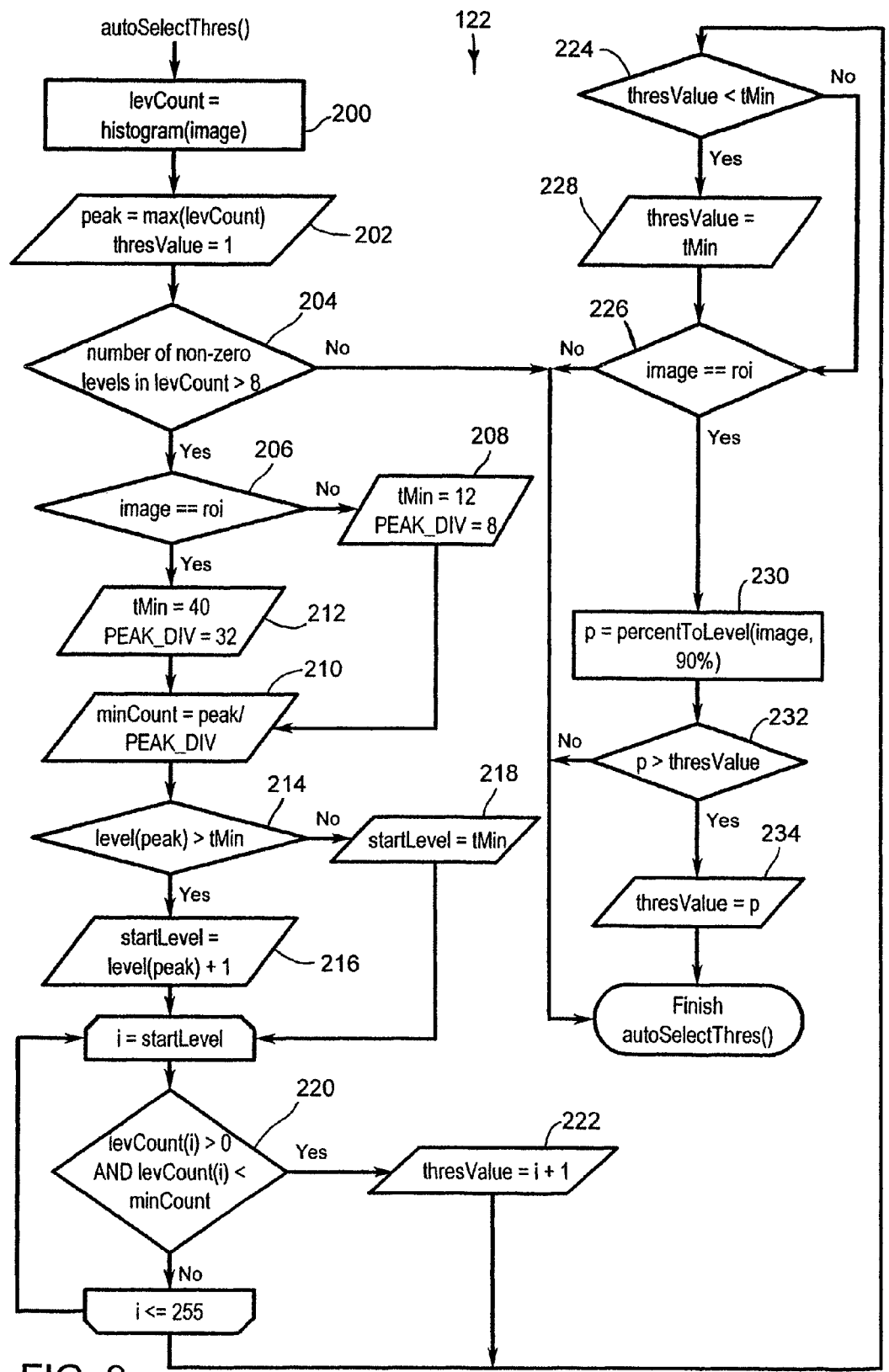
FIG. 9 is a flowchart showing the steps performed during execution of an autoSelectThres( ) function.
Figure 10:
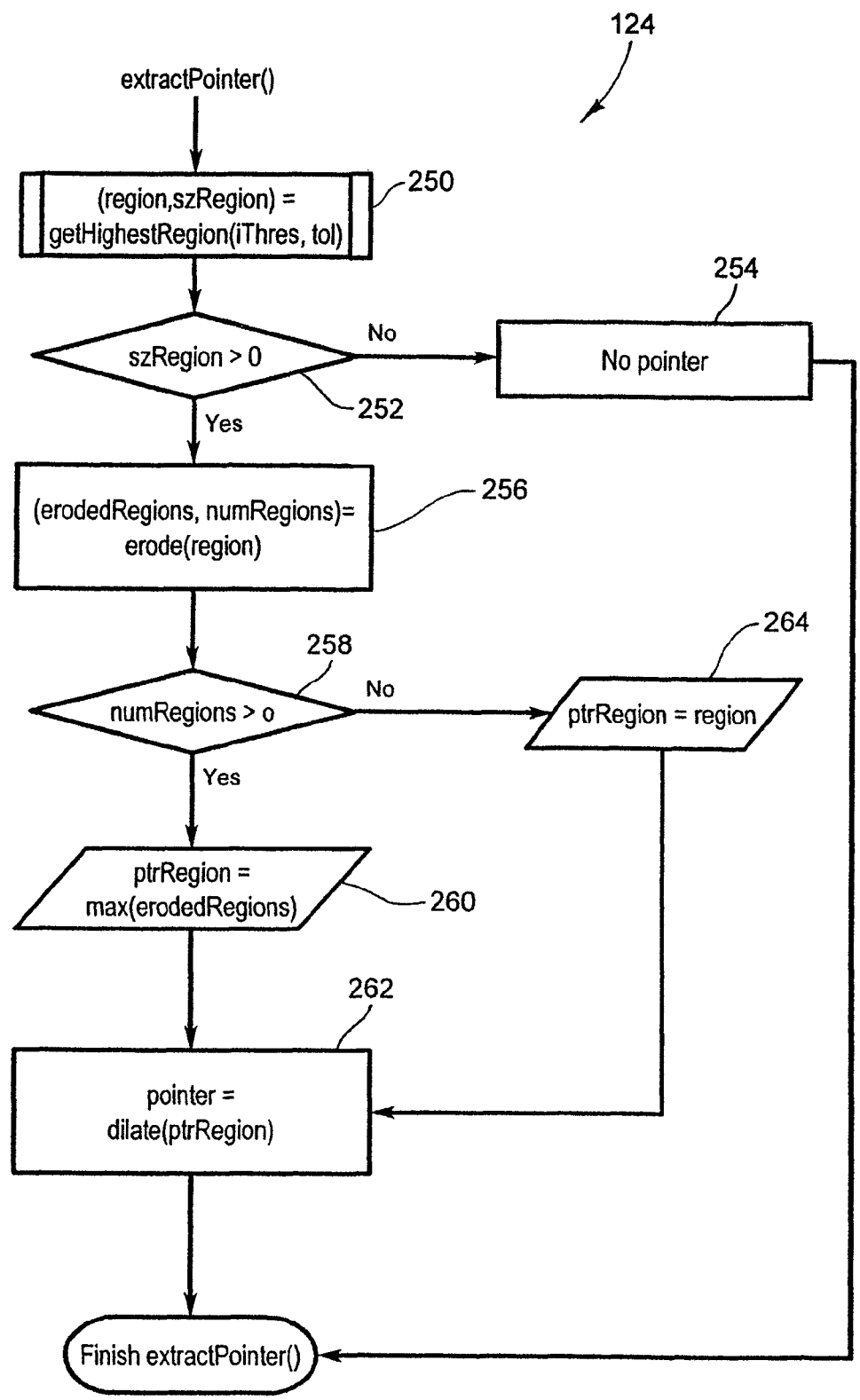
FIG. 10 is a flowchart showing the steps performed during execution of an extractPointer function.

Turning now to FIG. 9, the steps performed during execution of the autoSelectThres( ) function 122 are illustrated. As can be seen, in order to select the threshold level, a histogram of the difference image iDiff is taken and the number of pixels in each bin of the histogram are counted (step 200). The number of pixels in the bin having the highest count is used as a peak parameter and the threshold value is initially assigned a value of one (step 202). The number of bins having non-zero counts is then examined to determine if more than eight (8) bins have non-zero counts (step 204). If less than eight (8) bins have non-zero counts, the threshold value remains at its initially assigned value and the autoSelectThres( ) function is completed.

At step 204, if more than eight (8) bins have non-zero counts, the number of non-zero bins is checked again to determine if an entire difference image is being processed (i.e. the autoSelectThres( ) function was called by the findPointerMotion( ) function 120) or if a region of interest ROI within the difference image is being processed (i.e. the autoSelecThres( ) function was called by the processROI( ) function 128) (step 206). If the entire difference image iDiff is being processed, a threshold minimum parameter (tMin) is set to a value of twelve (12) and a Peak_Div parameter is set to a value of eight (8) (step 208). A minimum count parameter minCount is then calculated by dividing the peak parameter determined at step 202 by the Peak_Div parameter (step 210). If a region of interest is being processed, the threshold minimum parameter (tMin) is set to a value of forty (40) and the Peak_Div parameter is set to a value of thirty-two (32) (step 212) before proceeding to step 210.

Once minCount has been determined, the peak level is checked to determine if it is greater than the threshold minimum tmin (step 214). Peak level is the grayscale level that contains the most pixels. In the case of a tie, the grayscale level with the highest numerical value (i.e. the closest to 255)

is chosen. If the peak level is greater than the threshold minimum tMin, a startLevel parameter is assigned a value equal to the peak level+1 (step 216). At step 214, if the peak level is less than the threshold minimum tMin, the startLevel parameter is assigned a value equal to the threshold minimum tMin (step 218).

Following step 216 or 218, a loop is entered. During the loop, the levCount for each bin having a bin number between the value of the startLevel parameter and two hundred and fifty-five (255) is examined to determine if it is greater than zero and if it is less than the minCount parameter determined at step 210 (step 220). If the condition is met during the loop, the loop is exited and the threshold value is assigned a value equal to the bin number having the levCount that resulted in the loop being exited+1 (step 222). If the condition is not met, the loop is exited after the levCount for bin number 255 has been checked.

Once the loop has been exited, the threshold value is checked to determine if it is less than the minimum threshold value tMin (step 224). If not, a check is again made to determine if an entire difference image is being processed or whether a region of interest ROI is being processed (step 226). If the threshold value is less than the minimum threshold value tMin, the threshold value is set equal to the minimum threshold value tMin (step 228) before the check is made to determine if an entire difference image is being processed or whether a region of interest is being processed (step 226).

At step 226, if a difference image iDiff is being processed, the autoSelectThres( ) function is completed. However, if a region of interest is being processed, a parameter p is assigned a value corresponding to the first grayscale level at which 90% or more of the pixels will go black (step 230). The parameter p is then compared to the threshold level (step 232). If the parameter p is less than the threshold level, the autoSelectThres( ) function is completed. If the parameter p is greater than the threshold level, the threshold value is set to the value of parameter p (step 234) and the autoSelectThres( ) function is completed.

Figure 13:
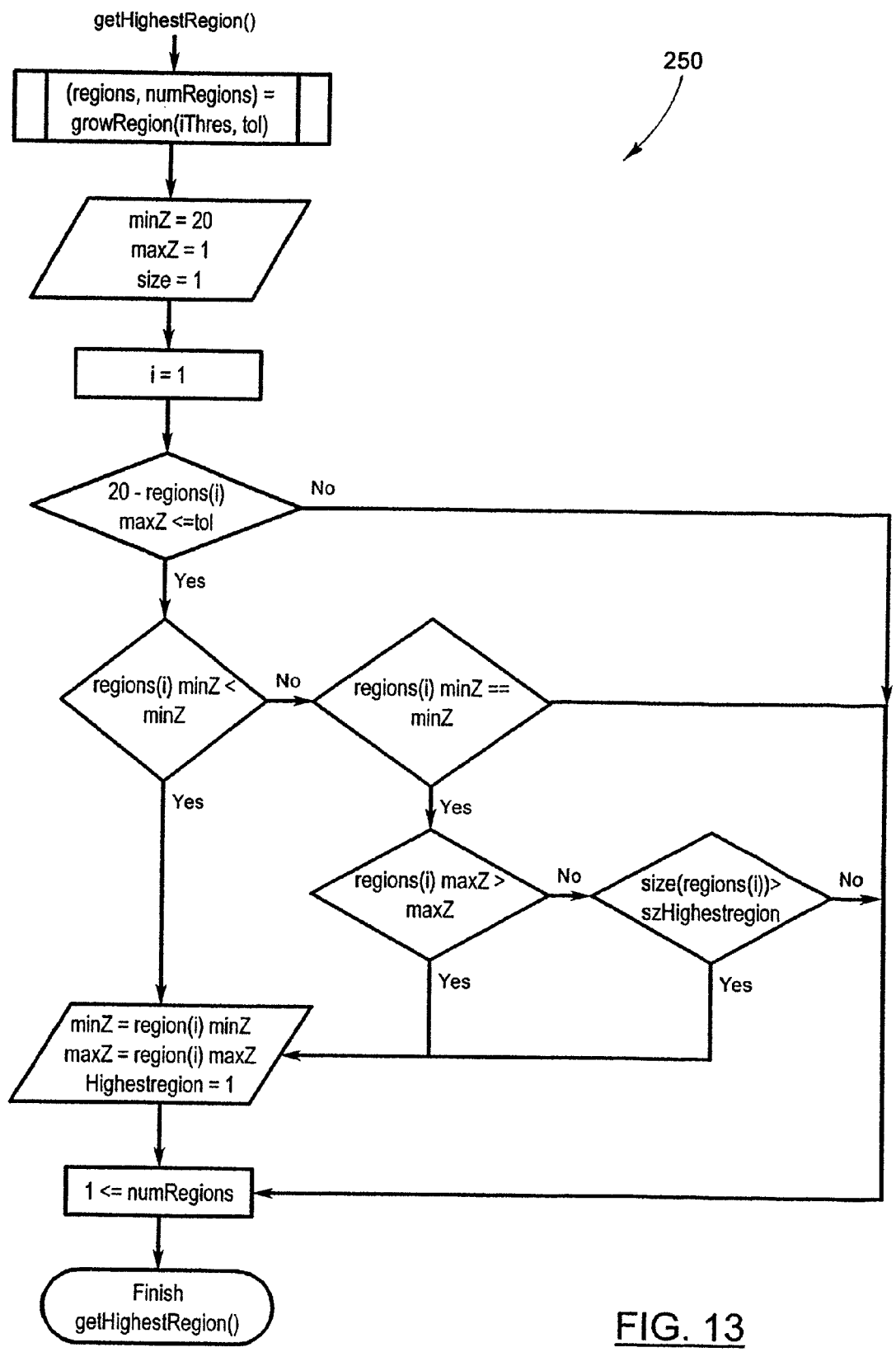
FIG. 13 is a flowchart showing the steps performed during execution of a getHighestRegion( ) function.

As mentioned above, at step 162 the findPointerMotion( ) function 120 calls the extractPointer( ) function 124 to extract the pointer from the binary image and ignore the noise. This is done by selecting the "white region" in the binary image that is greater than or equal to a certain minimum size and is the highest region (i.e. the largest in the y-axis (20 pixel axis)). Specifically, when the extractPointer( ) function 124 is called, the extractPointer( ) function calls the getHighestRegion( ) function 130 (step 250). The getHighestRegion( ) function 130 uses the threshold value and tol parameters to select the appropriate white region szRegion in the thresholded difference image. The tol parameter is used to avoid situations where board surface noise is mistaken as a pointer. FIG. 13 shows the steps performed during this function.

Once the white region szRegion has been selected, the white region szRegion is checked to see if it is greater than zero (step 252). If not, a no pointer condition is determined (step 254). If the white region szRegion is greater than zero, morphological operator of erosion and dilation are used on the white region to reduce further noise (steps 256 to 264) and the extractPointer( ) function is completed.

As mentioned above, at step 166 the findPointerMotion( ) function 120 calls the centerOfMass( ) function 126 to determine the center of the pointer. During this function, the black pixels in the binary image are treated as having a mass of zero (0) and the white pixel are treated as having a mass of one (1). The physics formulae for center-of-mass are used. The equation below gives the center of mass in the x-direction:

$$C_x = \text{sum}((X_i)/M)$$

where:

$X_i$ are the x-coordinates of the white pixels in the binary image; and

M is the number of white pixels in the binary image.

Figure 11:
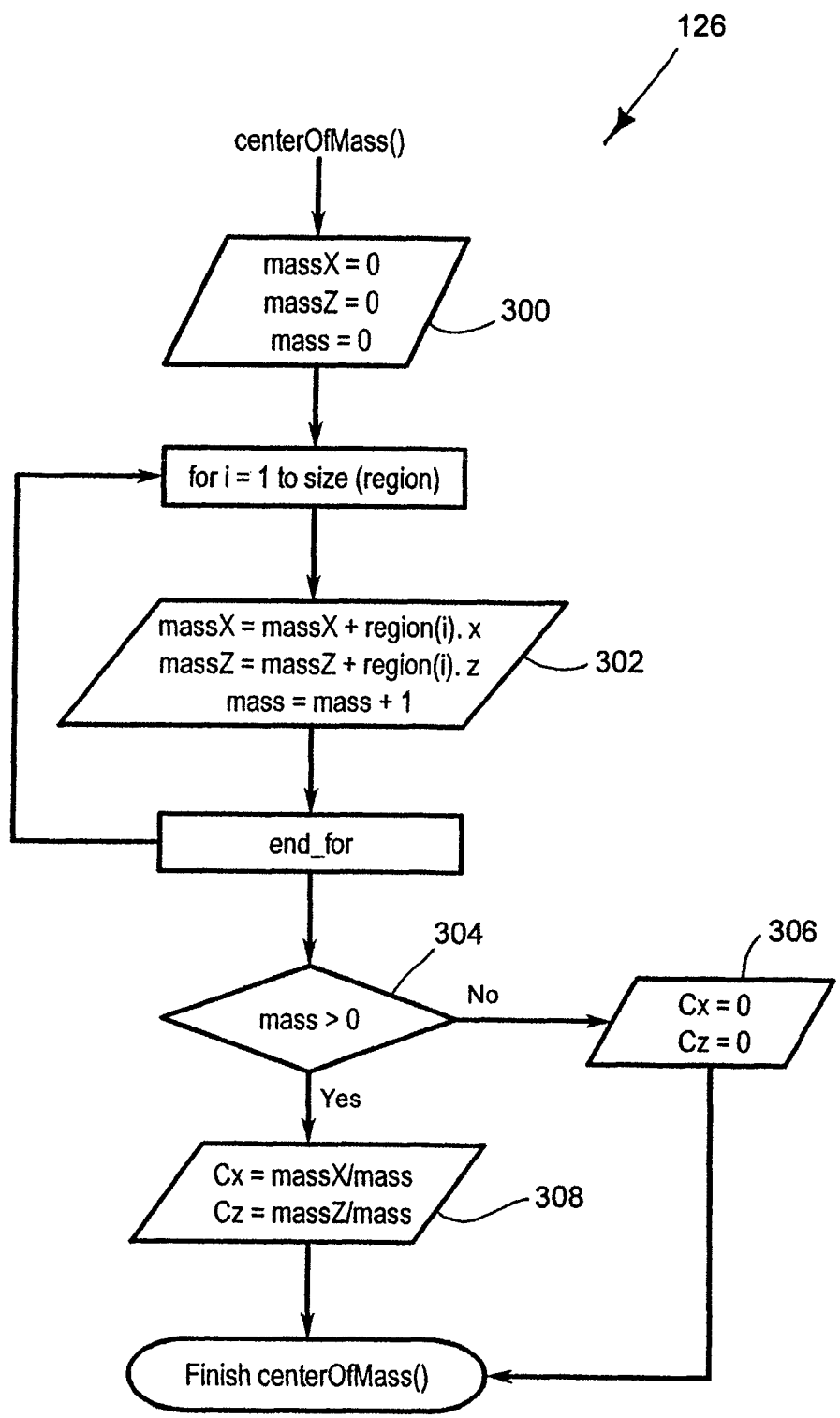
FIG. 11 is a flowchart showing the steps performed during execution of a centerOfMass( ) function.
Figure 12:
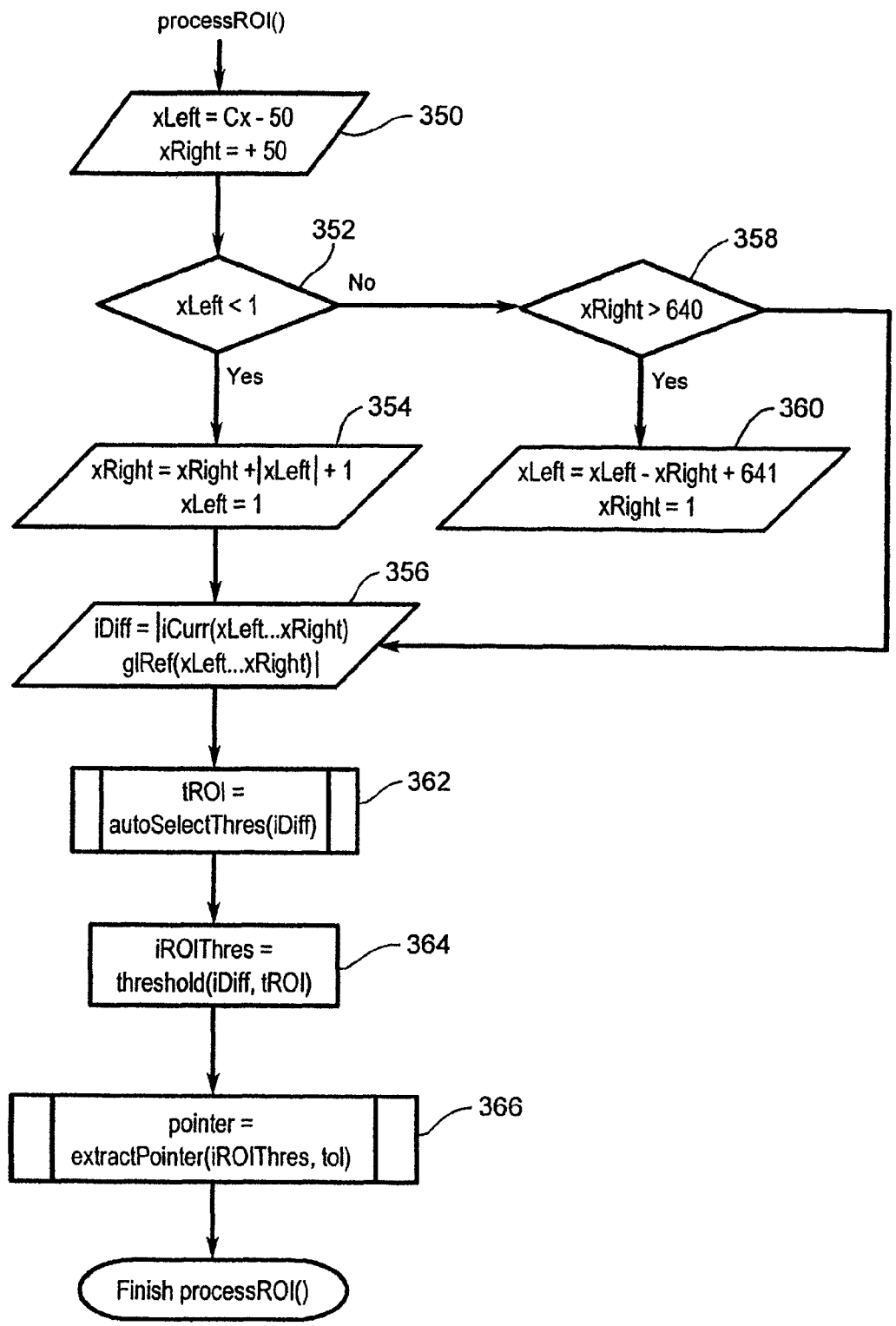
FIG. 12 is a flowchart showing the steps performed during execution of a processROI( ) function.

Initially, once the centerOfMass( ) function is executed, the center of mass parameters massX, massZ and a mass parameter are assigned zero values (see step 300 in FIG. 11). A loop is then entered to calculate the center of mass parameters massX and massZ using the above equation and to calculate the mass parameter (step 302).

Upon exiting the loop, the mass parameter is checked to determine if its value is greater than zero (step 304). If the value of the mass parameter is equal to zero, the center of mass parameters Cx and Cz are assigned values of zero (step 306) and the centerOfMass( ) function 126 is completed. At step 304, if the value of the mass parameter is greater than zero, the center of mass coordinates Cx and Cz are calculated (step 308) using the equations:

$$Cx = \text{mass}X/\text{mass}; \text{ and}$$

$$Cz = \text{mass}Z/\text{mass}.$$

Once the center of mass coordinates have been calculated, the centerOfMass( ) function 126 is completed.

Figure 15:
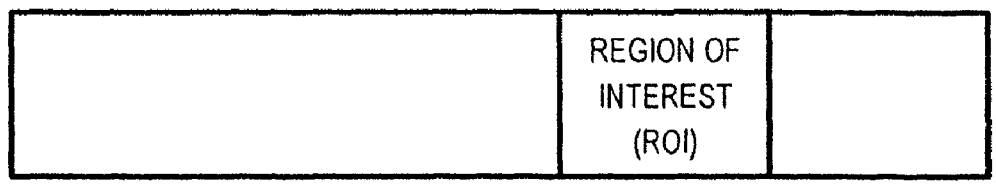
FIG. 15 shows a region of interest within the pixel subset.

As mentioned above, at step 168 the findPointerMotion( ) function 120 calls the processROI( ) function 128 to process the region-of-interest in a manner similar to the findPointerMotion( ) function 120 except, here the image size is 100×20 pixels and a calibration image including only background (i.e. no pointer) is used in place of the previous image. Upon execution of the processROI( ) function 128, xLeft and xRight parameters are calculated by subtracting and adding fifty (50) to the center of mass parameter Cx (step 350). The value of parameter xLeft is then checked to determine if it is less than one (1) (step 352). If the parameter xLeft has a value less than one (1), the parameter xRight is recalculated and the parameter xLeft is assigned a value of one (1) (step 354) to define boundaries of the region of interest as shown in FIG. 15. A difference image iDiff of the region of interest is then calculated by subtracting the region of interest of the current image from the region of interest of the calibration image gIRef determined at step 176 of the findPointerMotion( ) function 120 and taking the absolute value of the difference (step 356).

At step 352, if the parameter xLeft has a value greater than one (1), the parameter xRight is checked to determine if it has a value greater than 640 (step 358). If the parameter xRight has a value greater than 640, the parameter xLeft is recalculated and the parameter xRight is assigned a value of one (1) (step 360) to define boundaries of the region of interest. The processROI( ) function 128 then proceeds to step 356 to calculate the difference image iDiff of the region of interest. At step 358, if the parameter xRight has a value less than 640, the processROI( ) function 128 proceeds directly to step 356 to calculate the difference image iDiff of the region of interest.

Once the difference image iDiff of the region of interest has been calculated, the autoSelectThres( ) function 122 is called to select a threshold value for the difference image iDiff of the region of interest (step 362) in the manner described above with reference to FIG. 9. The difference image iDiff of the region of interest is then thresholded (step 364). Following this, the extractPointer( ) function 124 is called to extract the pointer from the difference image iDiff of the region of interest (step 366) in the manner described above with reference to FIG. 10.

Once the acquired image has been processed in the above manner, a PIP for the acquired image is created by the DSP 84. The PIP is a five (5) word packet and has a layout including camera identification, an LRC checksum to ensure data integrity and a valid tag to ensure zero packets are not valid. The valid tag indicates whether the PIP relates to a pointer characteristic packet (10), a diagnostic packet for a specific camera assembly 63 (01) or a diagnostic packet for all camera assemblies 63 (11). Table 1 below shows the PIP layout.

TABLE 1

| Word | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Pointer Characteristics packet (generated by Camera) ||||||||||||||||
| 0 | Valid tag || Camera # |||| X Intercept (at Y0) |||||||||
| 1 | Frame rate |||||||| intensity/color ||||||||
| 2 | Packet # |||||||| pointer area ||||||||
| 3 | Unused |||||||| X intercept (at Y19) ||||||||
| 4 | Unused |||| Z position |||| LRC checksum ||||||||
| Diagnostic Packet (generated by Camera or Master) ||||||||||||||||
| 0 | Valid tag || Camera # ||||||||||||||
| 1 ||||||||||||||||
| 2 | Packet # |||||||||||||||
| 3 ||||||||||||||||
| 4 |||||||||| LRC checksum ||||||

As mentioned above, each camera assembly 63 acquires and processes an image in the manner described above in response to each clock signal generated by its DSP 84. The PIPs created by the DSPs 84 are only sent to the master controller 54 when the camera assemblies 63 are polled by the master controller. The DSPs 84 create PIPs faster than the master controller 54 polls the camera assemblies 63. PIPs that are not sent to the master controller 54 are overwritten.

When the master controller 54 polls the camera assemblies 63, frame sync pulses are sent to the camera assemblies 63 to initiate transmission of the PIPs created by the DSPs 84. Upon receipt of a frame sync pulse, each DSP 84 transmits the PIP to the master controller 54 over the data bus. The PIPs transmitted to the master controller 54 are received via the serial port 96 and auto-buffered into the DSP 90.

After the DSP 90 has polled the camera assemblies 63 and has received PIPs from each of the camera assemblies, the DSP 90 processes the PIPs using triangulation to determine the location of the pointer relative to the touch surface 60 in (x,y) coordinates. Specifically, the PIPs from pairs of camera assemblies 63 are processed using triangulation.

Figure 16:
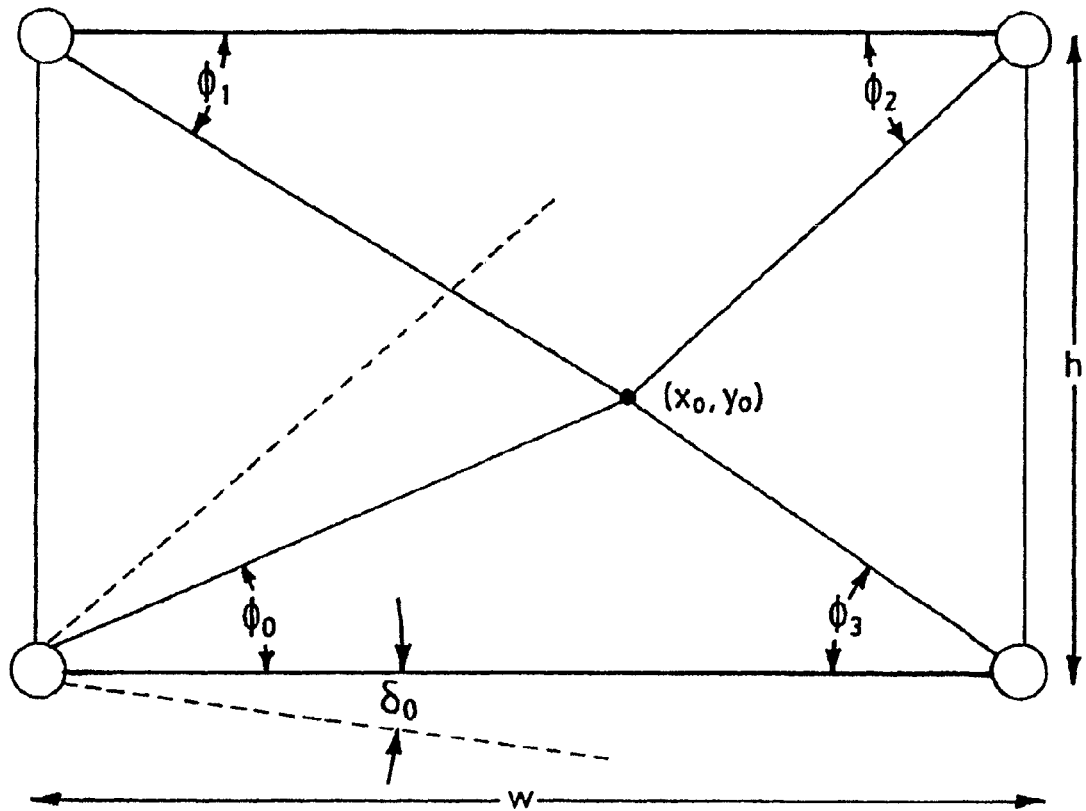
FIG. 16 shows the triangulation geometry used to calculate a pointer contact position on the touch surface of the touch screen.
Figure 17:
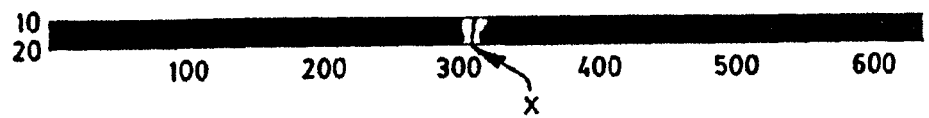
FIG. 17 shows an image acquired by an image sensor and lens assembly including the pointer and its median line.

FIG. 16 shows that two angles $\phi_1$ and $\phi_2$ are needed to triangulate the position $(x_0, y_0)$ of the pointer relative to the touch screen 60. The PIPs generated by each camera assembly 63 include a number $\theta \epsilon [0, sensorResolution-1]$ (see FIG. 17) identifying the median line of the pointer. The sensor Resolution, in the case of the Photobit PB300 image sensor, is 640. The equations below relate the angle $\phi$ to the position $\theta$ taking into account the field-of-view of the image sensor and lens assembly 80:

$$\phi = \frac{\theta}{sensorResolution} \times F_{ov} - \delta \quad (1)$$

$$\phi = \frac{SensorResolution - \theta}{sensorResolution} \times F_{ov} - \delta \quad (2)$$

The above equations subtract away an angle δ that allows the image sensor and lens assembly 80 to have some overlap with the frame 62. The overlap with the frame 62 is desired due to mechanical tolerance issues in the frame assemblies 64 (i.e. the angle of the plate 66 can have an error of 1° to 2°). The angle δ is allowed to be negative, meaning that there is no overlap with the frame 62, in fact part of the touch surface 60 along the frame 62 is missed. Equation 1 or 2 is used to determine. φ, depending on the mounting and/or optical properties of the image sensor and lens assembly 80. If the image acquired by the camera assembly 63 is rotated as a result of the mounting and/or optical properties of the image sensor and lens assembly 80, then equation 2 is used. Equation 1 is used otherwise. In the present embodiment, equation 1 is used with the camera assemblies 63 positioned at the top left and bottom right corners of the touch screen 52 and equation 2 is used with the camera assemblies 63 positioned at the bottom left and top right corners of the touch screen 52.

As discussed above, equations 1 and 2 allow the pointer median line data included in the PIPs to be converted by the DSP 90 into an angle φ with respect to the x-axis. When two such angles are available, the intersection of the median lines extending at these angles from their respective camera assemblies 63 yields the location of the pointer relative to the touch surface 60.

In this embodiment, since the touch screen 52 includes four camera assemblies 63, six pairs of camera assemblies can be used for triangulation. The following discussion describes how a pointer position is determined by triangulation for each pair of the camera assemblies 63.

In order to determine a pointer position using the PIPs received from the camera assemblies 63 along the left side of the touch screen 52, the following equations are used to determine the $(x_0, y_0)$ coordinates of the pointer position given the angles $\phi_0$ and $\phi_1$ for the upper and lower camera assemblies:

$$x_0 = \frac{h}{w} \times \frac{1}{\tan(\phi_0) + \tan(\phi_1)} \quad (3)$$

$$y_0 = \frac{\tan(\phi_0)}{\tan(\phi_0) + \tan(\phi_1)} \quad (4)$$

where:

h is the height of the touch screen 52 i.e. the vertical distance from camera assembly focal point-to-focal point;

w is the width of the touch screen 52 i.e. the horizontal distance from camera assembly focal point-to-focal point; and $\phi_i$ is the angle with respect to the horizontal, measured using camera assembly i and equation 1 or 2.

For the camera assemblies 63 along on the right side of the touch screen 52, the following equations are used to determine the ($x_0$, $y_0$) coordinates of the pointer position given the angles $\phi_2$ and $\phi_3$ for the upper and lower camera assemblies:

$$x_0 = 1 - \frac{h}{w} \times \frac{1}{\tan(\phi_2) + \tan(\phi_3)} \quad (5)$$

$$y_0 = 1 - \frac{\tan(\phi_2)}{\tan(\phi_2) + \tan(\phi_3)} \quad (6)$$

The similarity between equations 3 and 5, i.e. equation 5=1-equation 3 once $\phi_2$ and $\phi_3$ have been substituted into equation 3 for $\phi_1$ and $\phi_2$ respectively should be apparent. Equations 4 and 6 are related in a similar manner.

In order to determine a pointer position using the camera assemblies 63 along the bottom of the touch screen 52, the following equations are used to determine the ($x_0$, $y_0$) coordinates of the pointer position given the angles $\phi_0$ and $\phi_3$ for bottom left and bottom right camera assemblies:

$$x_0 = \frac{\tan(\phi_3)}{\tan(\phi_0) + \tan(\phi_3)} \quad (7)$$

$$y_0 = \frac{w}{h} \times \frac{\tan(\phi_3)}{\tan(\phi_0) + \tan(\phi_3)} \times \tan(\phi_0) \quad (8)$$
$$= \frac{w}{h} \times x_0 \times \tan(\phi_0)$$

In order to determine a pointer position using the camera assemblies 63 along the top of the touch screen 52, the following equations are used to determine the ($x_0$, $y_0$) coordinates of the pointer position given the angles $\phi_1$ and $\phi_2$ for the top left and top right camera assemblies:

$$x_0 = \frac{\tan(\phi_2)}{\tan(\phi_1) + \tan(\phi_2)} \quad (9)$$

$$y_0 = 1 - \frac{w}{h} \times \frac{\tan(\phi_2)}{\tan(\phi_1) + \tan(\phi_2)} \times \tan(\phi_1) \quad (10)$$
$$= 1 - \frac{w}{h} \times x_0 \times \tan(\phi_1)$$

The similarity between equations 7 and 9, i.e. equation 9=equation 7 once $\phi_1$ and $\phi_2$ have been substituted into equation 7 for $\phi_0$ and $\phi_3$ should be apparent. Equations 8 and 10 have the following relationship: equation 10=1-equation 8 once $\phi_1$ and $\phi_2$ have been substituted into equation 8 for $\phi_0$ and $\phi_3$ respectively.

In order to determine a pointer position using the camera assemblies 63 across the bottom left to top right corner diagonal, the following equations are used to determine the ($x_0$,$y_0$) coordinates of the pointer position given the angles $\phi_0$ and $\phi_2$ for bottom left and top right camera assemblies:

$$x_0 = \frac{\frac{h}{w} - \tan(\phi_2)}{\tan(\phi_0) - \tan(\phi_2)} \quad (11)$$

$$y_0 = \frac{1 - \frac{w}{h} - \tan(\phi_2)}{\tan(\phi_0) - \tan(\phi_2)} \times \tan(\phi_0) \quad (12)$$

In order to determine a pointer position using the camera assemblies 63 across the bottom right to top left diagonal, the following equations are used to determine the ($x_0$,$y_0$) coordinates of the pointer position given the angles $\phi_1$ and $\phi_3$ for the bottom right and top left camera assemblies:

$$x_0 = \frac{\frac{h}{w} - \tan(\phi_3)}{\tan(\phi_1) - \tan(\phi_3)} \quad (13)$$

$$y_0 = 1 - \frac{1 - \frac{w}{h} - \tan(\phi_3)}{\tan(\phi_1) - \tan(\phi_3)} \times \tan(\phi_1) \quad (14)$$

The similarity between equations 11 and 13, i.e. equation 13=equation 11 once °1 and °3 have been substituted into equation 11 for $\phi_0$ and $\phi_2$ should be apparent. Equations 12 and 14 have the following relationship: equation 14=1-equation 12 once $\phi_1$ and $\phi_3$ have been substituted into equation 12 for $\phi_0$ and $\phi_2$ respectively.

As will be appreciated, the above equations generate the coordinates $x_0$ and $y_0$ on a scale of [0, 1]. Therefore, any appropriate coordinate scale can be reported by multiplying $x_0$ and $y_0$ by the maximum X and maximum Y values respectively.

In the present embodiment, the DSP 90 calculates the pointer position using triangulation for each camera pair excluding the diagonal pairs. The resulting pointer positions are then averaged and the resulting pointer position coordinates are queued for transmission to the personal computer 56 via the serial port 98 and the serial line driver 94. Since the rows of pixels of the image sensor and lens assemblies 80 that correspond to actual contacts with the touch surface 60 are known, any Z-position in a PIP that does not correspond with one of these rows is by definition a pointer hover event.

Figure 18:
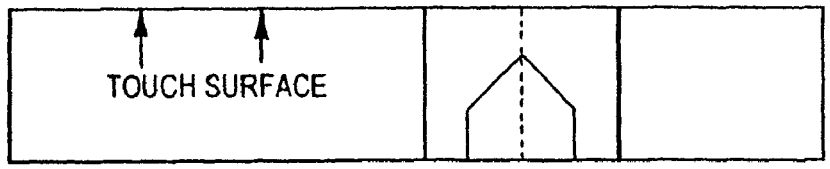
FIG. 18 shows pointer contact and pointer hover for different orientations of the pointer.
Figure 18:
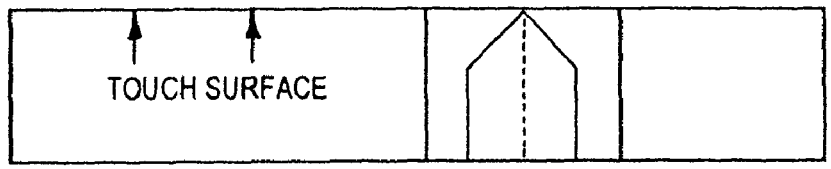
Figure 18:
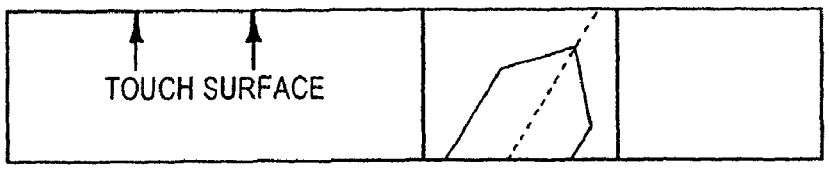
Figure 18:
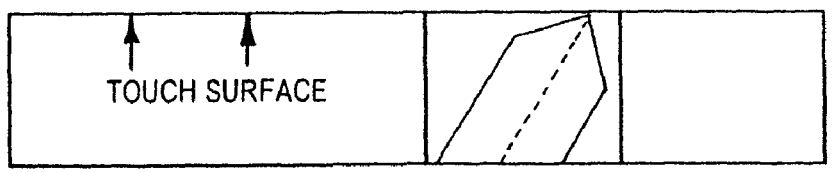

If desired, pointer velocity and angle can be calculated by the DSP 90 as shown in FIG. 18. The velocity of the pointer is calculated by examining the changes in the Z-position (or X-intercept) of the pointer in successive PIPs and knowing the camera frame rate. For example, if the camera frame rate is 200 frames per second and the Z-position changes by 1 pixel per frame, the pointer velocity is 200 pixels per second.

The angle of the pointer can be determined due to the fact that the PIP includes the X-intercept at pixel rows 0 and 19 of the median line. Since the X distance (the difference between X-intercepts) and the Y distance (the number of pixel rows) are known, all of the information necessary to calculate the pointer angle is available.

The present invention provides advantages in that the passive touch system 50 does not suffer parallax and/or image distortion problems due to the fact that a glass or other transparent overlay over a computer or video display is not required. In addition, the present passive touch system 50 allows both pointer contact and pointer hover over the touch surface 60 to be detected by using two-dimensional image sensor and lens assemblies 80 in the plane of the touch surface 60. Pointer contact with the touch surface 60 is defined only when the pointer is in very close proximity of the touch surface. The present invention also provides advantages in that the pointer position with respect to the touch surface is not restricted since the image sensor and lens assemblies 80 look along the plane of the touch surface 60.

With respect to resolution, the resolution of the passive touch system is a function of the distances of the pointer with respect to the image sensor and lens assemblies 80, the number of pixel elements in the image sensor and lens assemblies and the fields of view of the image sensor and lens assemblies. Since image sensor and lens assemblies are available with pixel elements that range in number from tens of thousand to many millions and since the number of pixel elements in image sensors and lens assemblies of this nature is only expected to increase, the resolution of the present passive touch system 50 is high.

The passive touch system 50 also provides advantages in that alignment is automatically corrected since only pixel subsets of images that include the touch surface and the pointer are processed. In addition, the present passive touch system allows for very fast acquisition of image data since the image sensor and lens assemblies can be triggered to capture images at rates exceeding two hundred frames per second.

The present passive touch system 50 is scalable and can include a touch surface 60 of arbitrary size. When used in conjunction with a projected computer image, the number of pixels of the image sensor and lens assemblies should be proportional to the number of pixels being displayed on the touch surface 60. For example, if a projected computer image is 1024×768 pixels, the size of the projected image is not be of concern provided the image sensor and lens assemblies 80 are able to resolve the (x,y) coordinates with sufficient accuracy with respect to the displayed pixels.

Although the passive touch system 50 is shown including camera assemblies 63 associated with each corner of the touch screen 52, those of skill in the art will appreciate that only two camera assemblies are required. In this case, the fields of view of the image sensor and lens assemblies are preferably selected so that the entire touch surface 60 is encompassed since the locations of pointer contacts are determined only when they occur within the overlapping fields of view of the camera assemblies 63.

Also, although the passive touch system 50 is described as including a projector to display the computer display output onto the touch surface 60, this is not required. No information need be displayed on the touch surface.

Although a preferred embodiment of the present invention has been described, those of skill in the art will appreciate that variations and modifications may be made without departing from the spirit and scope thereof as defined by the appended claims.

What is claimed is:

1. A method of determining the absolute position of an object relative to a rectangular frame surrounding a region of interest in the front of a display surface from images captured by at least two digital camera devices, each digital camera device being mounted adjacent a different corner of the frame, said method comprising:

capturing images with the digital camera devices, each digital camera device having a field of view that (i) images at least a portion of the display surface, (ii) images at least a portion of the frame, and (iii) extends at least beyond an adjacent peripheral edge of said frame, said digital camera devices being oriented to capture overlapping images of said region of interest, at least one of the digital camera devices having a sensor comprising a plurality of pixels extending in at least one direction; and processing pixel data of images received from each digital camera device using at least one processor to compensate for an angle between the field of view of each digital camera device and at least a portion of the peripheral edge of the frame and to determine the absolute position of the object relative to the frame.

2. The method of claim 1, wherein said image capturing comprises capturing images with digital camera devices that each comprise a CMOS image sensor.

3. The method of claim 1, wherein each digital camera device comprises a selectable pixel array, and wherein during said processing, pixel data from a subset of pixels of the selectable pixel array of each digital camera device is processed.

4. The method of claim 3, wherein during said processing, pixel data from a subset of contiguous rows of pixels of the selectable pixel array of each digital camera device is processed.

5. The method of claim 3, wherein during said processing, pixel data from a subset of contiguous rows of pixels, that is aligned so that the subset of pixels looks generally along a plane substantially coplanar to said display surface, of the selectable pixel array of each digital camera device is processed.

6. The method of claim 5, wherein during said processing, the row of pixels in the subset of pixels of the selectable pixel array of each digital camera device, that acquires pixel data corresponding to a tip of said pointer within said region of interest, is determined to detect pointer contact and pointer hover over said display surface.

7. A method of determining the absolute position of an object relative to a rectangular frame surrounding a region of interest in the front of a display surface from images captured by at least two imaging assemblies, each imaging assembly being mounted adjacent a different corner of the frame, said method comprising:

capturing images with the imaging assemblies, each imaging assembly being oriented so that the fields of view of the imaging assemblies overlap across the front of the display surface and so that the field of view of each imaging assembly extends at least beyond an adjacent peripheral edge of said frame, at least one of the imaging assemblies having a sensor comprising a plurality of pixels extending in at least one direction; and processing pixel data of images received from each imaging assembly using at least one processor to compensate for an angle between the field of view of each imaging assembly and at least a portion of the peripheral edge of the frame and to determine the absolute position of the object relative to the frame.

8. The method of claim 7, wherein said image capturing comprises capturing images with imaging assemblies that each comprise a CMOS image sensor.

9. The method of claim 7, wherein during said processing, a subset of pixel data of images captured by each imaging assembly is processed.

10. The method of claim 7, wherein during said processing, a subset of contiguous rows of pixel data of images captured by each imaging assembly is processed.

11. The method of claim 7, wherein during said processing, a subset of contiguous rows of pixel data that is aligned so that the subset looks generally along a plane substantially coplanar to said display surface, of images captured by each imaging assembly is processed.

12. The method of claim 11, wherein during said processing, the row that acquires pixel data corresponding to a tip of said pointer within said region of interest, is determined to detect pointer contact and pointer hover over said display surface.

* * * * *